(12) United States Patent
Cheng

(10) Patent No.: US 7,938,569 B2
(45) Date of Patent: May 10, 2011

(54) BACKLIGHT FRAME

(75) Inventor: Wei Cheng, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 349 days.

(21) Appl. No.: 11/956,965

(22) Filed: Dec. 14, 2007

(65) Prior Publication Data
US 2008/0253136 A1    Oct. 16, 2008

(30) Foreign Application Priority Data

Apr. 11, 2007  (CN) .......................... 2007 2 0104209

(51) Int. Cl.
*F21V 7/04* (2006.01)
(52) U.S. Cl. ........................................ 362/633; 362/632
(58) Field of Classification Search .................. 362/97.4, 362/362, 368, 632, 633, 634; 349/58
See application file for complete search history.

(56) References Cited

U.S. PATENT DOCUMENTS

| 7,271,861 B2 * | 9/2007 | Yamazaki ........................ 349/58 |
| 2006/0055839 A1 * | 3/2006 | Hirao et al. ...................... 349/58 |
| 2007/0108295 A1 * | 5/2007 | Liu et al. ........................ 361/737 |

FOREIGN PATENT DOCUMENTS

| JP | 2000258756 A | * | 9/2000 |
| JP | 2002-75033 A | | 3/2002 |
| JP | 2005-528748 A | | 9/2005 |
| KR | 2003-0091147 A | | 12/2003 |
| KR | 2006-0101689 A | | 9/2006 |

* cited by examiner

*Primary Examiner* — Y My Quach Lee
(74) *Attorney, Agent, or Firm* — Sheridan Ross P.C.

(57) ABSTRACT

Provided is a backlight frame, which comprises a frame body comprising attaching blocks disposed at four corner portions of the frame body, respectively, and a metal plate disposed on a mounting surface of at least one of the attaching blocks. A hardness of the metal plate is higher than a hardness of the attaching blocks. The metal plates are capable of reducing the defects of the backlight due to abrasive dust and thus facilitating the assembling process and improving the quality and yield of the products.

16 Claims, 4 Drawing Sheets

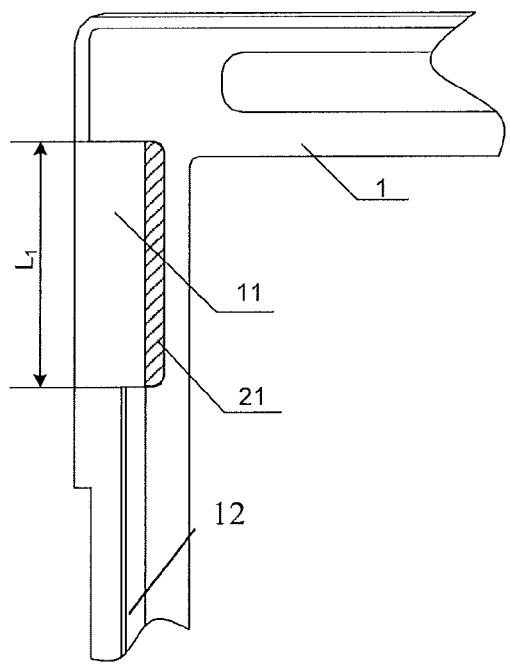
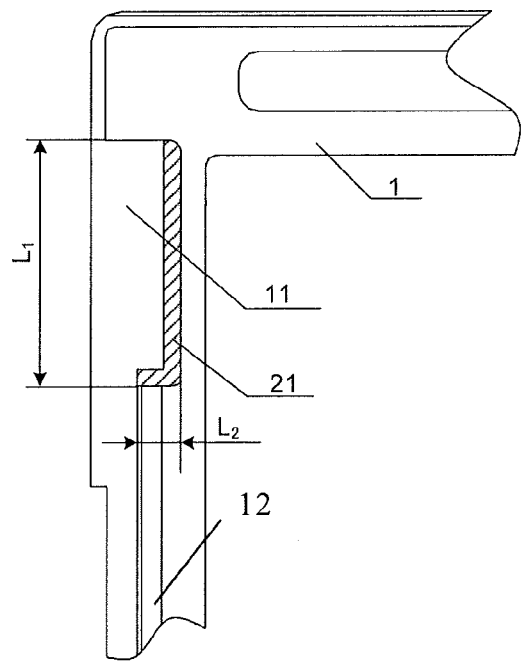
Figure 2
Figure 3
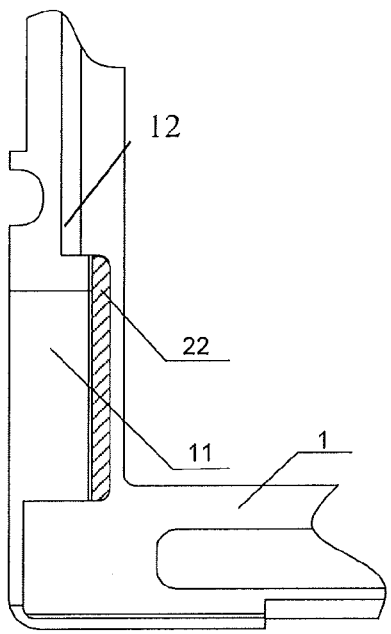
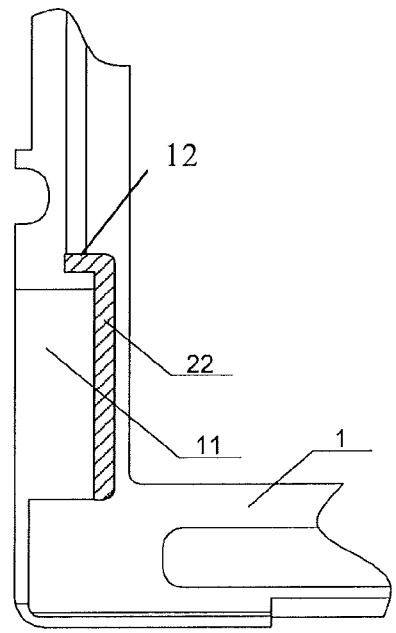
Figure 4
Figure 5

US 7,938,569 B2

BACKLIGHT FRAME

The present application claims the priority of the Chinese patent application No. 200720104209.8 filed with the Chinese Intellectual Property Office on Apr. 11, 2007, which is incorporated herewith by reference.

BACKGROUND OF THE INVENTION

The present invention relates to a backlight, and more particularly, to a backlight frame.

Currently flat display devices are widely applied to electronic, communication and appliance consumer products, with focus on the operation reliability of those devices. It is shown that the operation reliability of the flat device depends on the product quality during the manufacturing process in some degree.

For a backlight unit used in a plasma display panel (PDP), twisted nematic liquid crystal display (TN-LCD), super twisted nematic LCD (STN-LCD), and thin film transistor (TFT-LCD), it is found that the frame body, the alumina back plate and the light guide plates included in the backlight unit are liable to suffer from abrasion during assembling processes, and the resulting abrasive dusts become foreign particles in the backlight unit, causing a poor performance and lowering the operation reliability of the backlight unit. Thus strict process requirements are imposed to alleviate such influence in conventional processes with a limited beneficial effect and thus lowering production yield.

SUMMARY OF THE INVENTION

In one aspect of the invention, there is provided a backlight frame in order to address the above technical problems encountered in the prior art.

Accordingly, one aspect of the present invention provides a backlight frame. The backlight frame comprises a frame body comprising attaching blocks disposed at four corner portions of the frame body, respectively, and a metal plate disposed on a mounting surface of at least one of the attaching blocks, and a hardness of the metal plate is higher than a hardness of the attaching blocks.

Preferably, the metal plate can be disposed on a longitudinal mounting surface of the at least one of the attaching blocks. Alternatively, the metal plate can be disposed on both a longitudinal mounting surface and a horizontal mounting surface of the at least of the attaching blocks.

Preferably, the metal plate can be made of aluminum.

Preferably, the metal plate may be embedded in the mounting surface of the attaching block at the four corners of the frame body, thus improving the hardness of the attaching blocks at the position subjected to abrasion without affecting the assembling of the backlight, reducing the defects of the backlight due to abrasive dust, and thus facilitating the assembling process and improving the quality and yield of the products. The embodiment of the present invention can be widely applied to the backlight units used in a PDP, TN-LCD, STN-LCD and TFT-LCD.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 2 is a schematic view showing an upper left portion of the backlight frame according to one embodiment of the present invention;

FIG. 3 is a schematic view showing an upper left portion of the backlight frame according to another embodiment of the present invention;

FIG. 4 is a schematic view showing a lower left portion of the backlight frame according to one embodiment of the present invention;

FIG. 5 is a schematic view showing a lower left portion of the backlight frame according to another embodiment of the present invention;

DETAILED DESCRIPTION OF THE PREFERRED EMBODIMENTS

The exemplary embodiments according to the present invention will be described hereinafter in detail with reference to the accompanying drawings. This invention may, however, be embodied in many different forms and should not be construed as limited to the embodiments set forth herein. In the context, it will be understood that when an element or layer is referred to as being "on" or "connected to" another element or layer, it can be directly on or connected to the other element or layer, or an intervening element or layer may be present. Throughout this disclosure, the same reference number indicates the same or similar layer or element among the embodiments.

Figure 1:
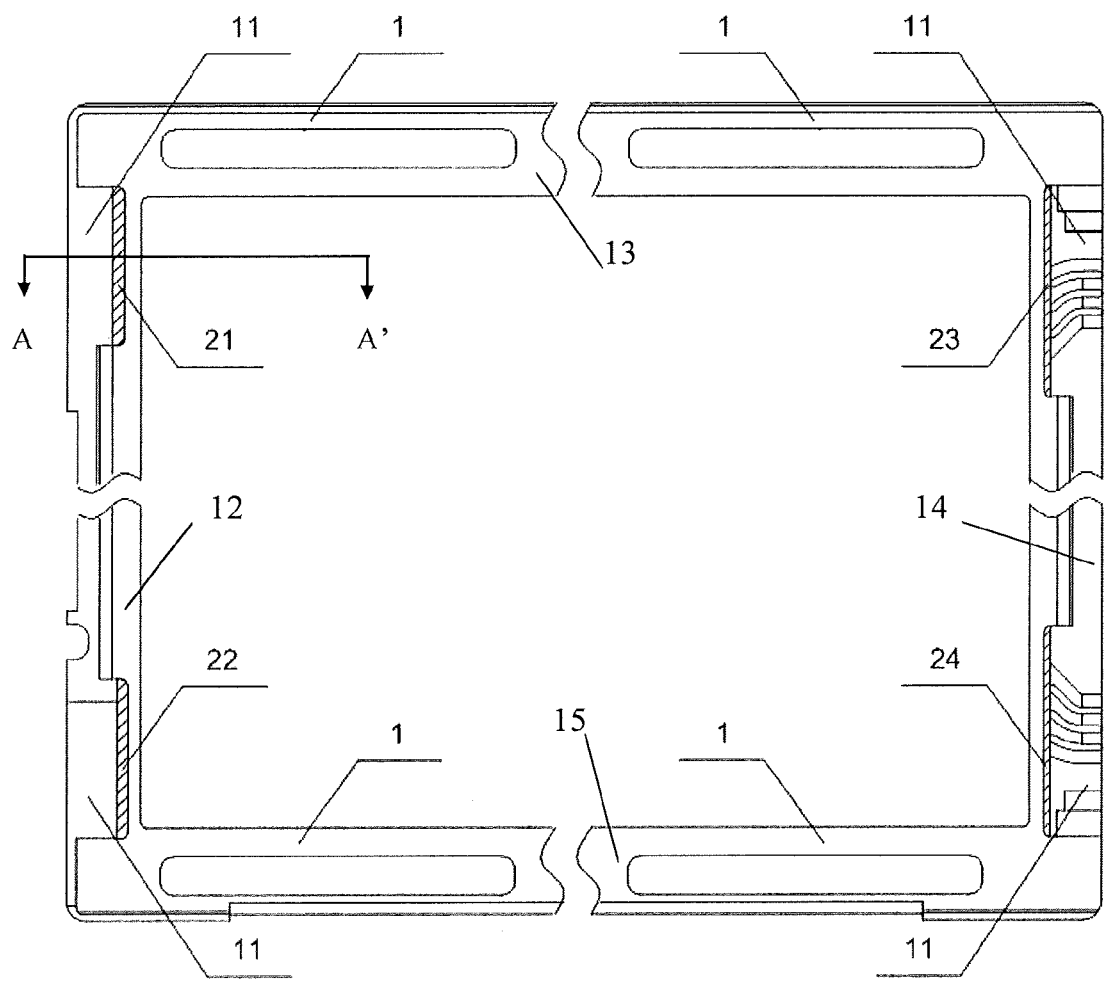
FIG. 1 is a schematic view of a backlight frame according to one embodiment of the present invention.
Figure 10:
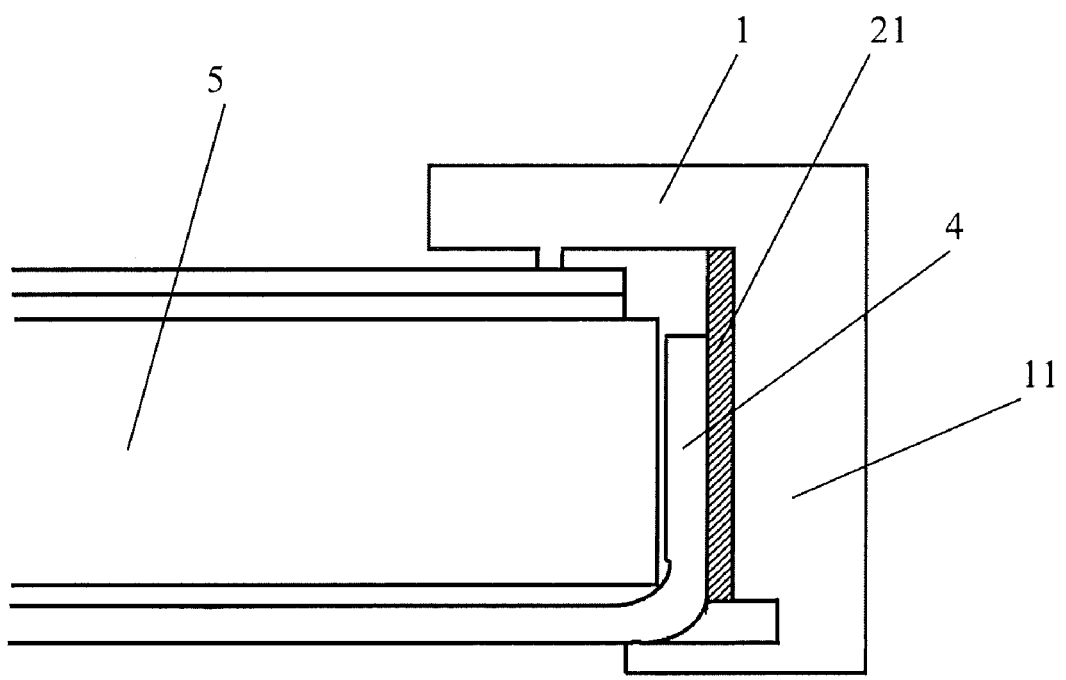
FIG. 10 shows a cross-sectional view taken along the line A-A' in FIG. 1.

FIG. 1 is a schematic view of a backlight frame according to one embodiment of the present invention, and FIG. 10 shows a cross-sectional view taken along line A-A' in FIG. 1. As shown in FIG. 1 and FIG. 10, the main body of the backlight frame comprises a frame body 1, which is assembled with an aluminum back plate 4 and a light guiding plate 5 so as to form a backlight unit. The frame body 1 comprises a left bar 12, a right bar 14, a upper bar 13, and a lower bar 15 as shown in FIG. 1, and these bars 12-15 form the four sides of the frame body 1 of a rectangular shape. Attaching blocks 11 are disposed at four corner portions of the frame body 1 in order to be assembled with the aluminum back plate 4 and the light guiding plate 5. A conventional frame body 1 is made of one material with a hardness lower than that of the aluminum back plate and the light-guiding plate, therefore the mounting surfaces, for example, the inner surfaces of the attaching blocks 11, which are in contact with other members in the backlight unit such as the back plate and the light-guiding plate during assembly, are liable to suffer abrasion, and the resulting abrasive dusts become foreign particles in the backlight unit, lowering the operation reliability of the backlight unit.

According to one embodiment of the present invention, metal plates are placed on attaching blocks of the frame body 1 at positions where the abrasion likely occurs in order to enhance the hardness, thereby reducing the defects due to abrasion during assembly, such as foreign particles. Metal plates 21-24 are disposed on mounting surfaces of four attaching blocks 11 at four corner portions of the frame body 1. In particular, the metal plates 21-24 are embedded in recesses formed on the mounting surfaces of the attaching blocks, respectively, thus improving the hardness at the position where abrasion likely occur and eliminating the abrasive dust without affecting the assembling of the backlight units. In this way, the defects of the backlight units due to the foreign particles are reduced, the assembly process is facilitated and the production yield is improved. The metal plates 21-24 can be disposed in singular or in combination as necessary.

FIG. 2 is a schematic view showing an upper left portion of the frame according to one embodiment of the present invention. As shown in FIG. 2, the attaching block 11 is disposed on the longitudinal bar 12 of the frame body 1 and the metal plate 21 is embedded in the longitudinal mounting surface of the attaching block 11 accordingly. In particular, the metal plate plate 21 has a dimension of 10 mm-15 mm in length, 4 mm-6 mm in width and 0.4 mm-0.6 mm in thickness. Preferably, the metal plate has a dimension of 12 mm in length, 6 mm in width and 0.5 mm in thickness.

FIG. 3 is a schematic view showing an upper left portion of the frame according to another embodiment of the present invention. As shown in FIG. 3, the metal plates 21 is embedded in both the longitudinal mounting surface and the horizontal mounting surface of the attaching block 11 so as to form a bending shape including a long portion and a short portion to cover the entire mounting surfaces of the attaching block 11. The long portion and the short portion can be disposed in a separate or an integrated structure. In particular, the long portion of the metal plate 21 has a length of 10 mm-15 mm and the short portion of the metal plate 21 has a length of 1 mm-2 mm, and other dimension parameters are the same as those in the embodiment shown in FIG. 2. Preferably, the long portion has a length of 12 mm and the short portion has a length of 1.5 mm so as to enhance the hardness of the entire surface of the attaching block 11 which are liable to suffer abrasion.

FIG. 4 is a schematic view showing a lower left portion of the frame according to one embodiment of the present invention and FIG. 5 is a schematic view showing a lower left portion of the frame according to another embodiment of the present invention. As shown in FIG. 4, the attaching block 11 is disposed on the longitudinal bar 12 of the frame body 1 and the metal plate 22 is embedded in the longitudinal mounting surface of the attaching block 11. As shown in FIG. 5, the metal plate 22 is embedded in both the longitudinal mounting surface and the horizontal mounting surface of the attaching block 11. The shape and the structural parameters of the metal plate 22 in the present embodiment are the same as those in the embodiments shown in FIG. 2 and FIG. 3 and are not repeated herein.

Figure 6:
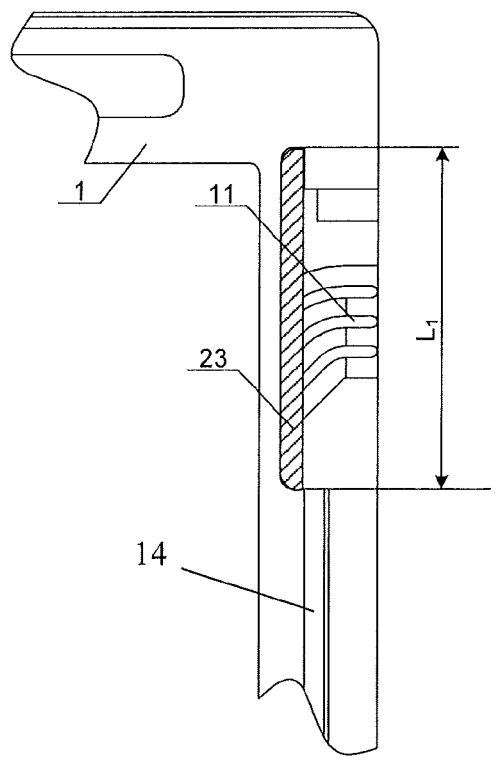
FIG. 6 is a schematic view showing an upper right portion of the backlight frame according to one embodiment of the present invention.

FIG. 6 is a schematic view showing an upper right portion of the frame according to one embodiment of the present invention. As shown in FIG. 6, the attaching block 11 is disposed on the longitudinal bar 14 of the frame body 1 and the metal plate 23 is embedded in the longitudinal mounting surface of the attaching block 11 accordingly. In particular, the metal plate 21 has a dimension of 15 mm-20 mm in length, 4 mm-6 mm in width and 0.4 mm-0.6 mm in thickness. Preferably, the metal plate has a dimension of 17 mm in length, 6 mm in width and 0.5 mm in thickness.

Figure 7:
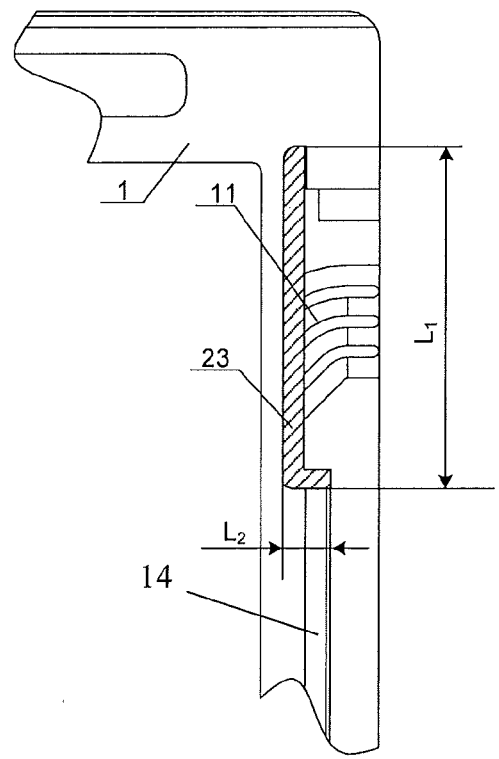
FIG. 7 is a schematic view showing an upper right portion of the backlight frame according to another embodiment of the present invention.

FIG. 7 is a schematic view showing an upper right portion of the frame according to another embodiment of the present invention. As shown in FIG. 7, the metal plates 23 is embedded in both the longitudinal mounting surface and the horizontal mounting surface of the attaching block 11 so as to form a bending shape including a long portion and a short portion to cover the entire mounting surfaces of the attaching blocks. The long portion and the short portion can be disposed in a separate or an integrated structure. In particular, the long portion of the metal plate 23 has a length of 15 mm-20 mm and the short portion of the metal plate 23 has a length of 1 mm-2 mm, and other dimension parameters are the same as those in the embodiment shown in FIG. 6. Preferably, the long portion has a length of 17 mm and the short portion has a length of 1.5 mm so as to enhance the hardness of the entire surface of the attaching block 11 which are liable to suffer abrasion.

Figure 8:
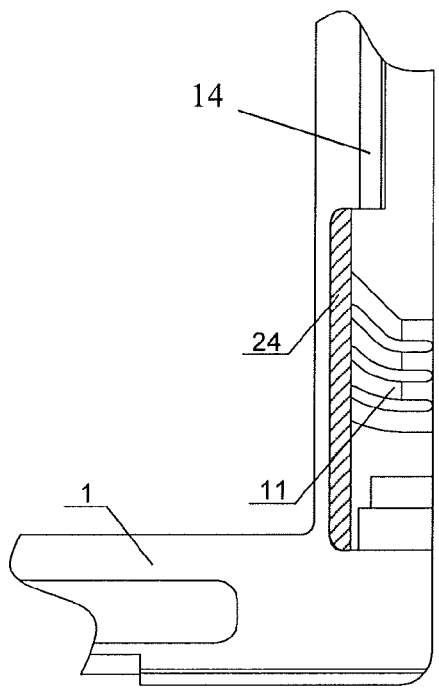
FIG. 8 is a schematic view showing a lower right portion of the backlight frame according to one embodiment of the present invention.
Figure 9:
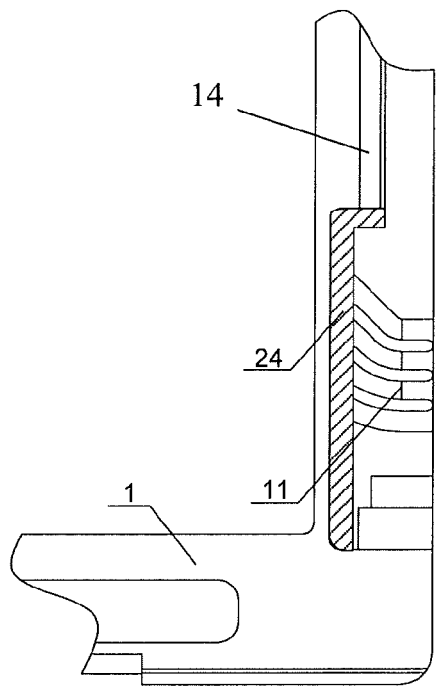
FIG. 9 is a schematic view showing a lower right portion of the backlight frame according to another embodiment of the present invention.

FIG. 8 is a schematic view showing a lower right portion of the frame according to one embodiment of the present invention and FIG. 9 is a schematic view showing a lower right portion of the frame according to another embodiment of the present invention. As shown in FIG. 8, the attaching block 11 is disposed on the longitudinal bar 14 of the frame body 1 and the metal plate 24 is embedded in the longitudinal mounting surface of the attaching block 11. As shown in FIG. 9, the metal plate 24 is embedded in both the longitudinal mounting surface and the horizontal mounting surface of the attaching block 11. The shape and the structural parameters of the metal plate 24 in the present embodiment are the same as those in the embodiments shown in FIG. 6 and FIG. 7 and are not repeated herein.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A backlight frame comprising:
    a frame body comprising attaching blocks disposed at four corner portions of the frame body, respectively, and each projected on a bar of the frame body to be assembled with a back plate and a light guiding plate through a mounting surface,
    a metal plate disposed on the respective mounting surface of each of the attaching blocks and inside the frame body,
    wherein the mounting surface of each of the attaching blocks faces the inside of the frame body and is parallel to the respective bar of the frame body, and
    wherein a hardness of the metal plate is higher than a hardness of the attaching blocks.

2. The backlight frame according to claim 1, wherein the metal plate is disposed on a longitudinal mounting surface of the at least one of the attaching blocks.

3. The backlight frame according to claim 2, wherein the metal plate disposed on the longitudinal mounting surface of the at least one of the attaching blocks has a dimension of 10 mm-15 mm in length, 4 mm-6 mm in width and 0.4 mm-0.6 mm in thickness.

4. The backlight frame according to claim 3, wherein the metal plate disposed on the longitudinal mounting surface of the at least one of the attaching blocks has a dimension of 12 mm in length, 6 mm in width and 0.5 mm in thickness.

5. The backlight frame according to claim 2, wherein the metal plate disposed on the longitudinal mounting surface of the at least one of the attaching blocks has a dimension of 15 mm-20 mm in length, 4 mm-6 mm in width and 0.4 mm-0.6 mm in thickness.

6. The backlight frame according to claim 5, wherein the metal plate disposed on the longitudinal mounting surface of the at least one of the attaching blocks has a dimension of 17 mm in length, 6 mm in width and 0.5 mm in thickness.

7. The backlight frame according to claim 1, wherein metal plates are disposed on both a longitudinal mounting surface and a horizontal mounting surface of the at least one of the attaching blocks.

8. The backlight frame according to claim 7, wherein the metal plate disposed on the longitudinal mounting surface of the at least one of the attaching blocks has a dimension of 10 mm-15 mm in length, 4 mm-6 mm in width and 0.4 mm-0.6 mm in thickness.

9. The backlight frame according to claim 8, wherein the metal plate disposed on the longitudinal mounting surface of the at least one of the attaching blocks has a dimension of 12 mm in length, 6 mm in width and 0.5 mm in thickness.

10. The backlight frame according to claim 7, wherein the metal plate disposed on the longitudinal mounting surface of the at least one of the attaching blocks has a dimension of 15 mm-20 mm in length, 4 mm-6 mm in width and 0.4 mm-0.6 mm in thickness.

11. The backlight frame according to claim 10, wherein the metal plate disposed on the longitudinal mounting surface of the at least one of the attaching blocks has a dimension of 17 mm in length, 6 mm in width and 0.5 mm in thickness.

12. The backlight frame according to claim 7, wherein the metal plate disposed on the horizontal mounting surface of the at least one of the attaching blocks has a dimension of 1 mm-2 mm in length, 4 mm-6 mm in width and 0.4 mm-0.6 mm in thickness.

13. The backlight frame according to claim 12, wherein the metal plate disposed on the horizontal mounting surface of the at least one of the attaching blocks has a dimension of 1.5 mm in length, 6 mm in width and 0.5 mm in thickness.

14. The backlight frame according to claim 1, wherein the metal plate is made of aluminum.

15. The backlight frame according to claim 2, wherein the metal plate is made of aluminum.

16. The backlight frame according to claim 7, wherein the metal plates are made of aluminum.

\* \* \* \* \*